United States Patent
Doherty et al.

(10) Patent No.: US 10,100,203 B2
(45) Date of Patent: Oct. 16, 2018

(54) THERMAL CONTROL COATINGS (71) Applicant: UNIVERSITY COLLEGE DUBLIN, NATIONAL UNIVERSITY OF IRELAND, DUBLIN, Dublin (IE)

(72) Inventors: Kevin A. J. Doherty, Dublin (IE); Barry Twomey, Dublin (IE); Kenneth Stanton, Bray (IE)

(73) Assignee: University College Dublin, National University of Ireland, Dublin (IE)

(*) Notice: Subject to any disclaimer, the term of this patent is extended or adjusted under 35 U.S.C. 154(b) by 0 days.

(21) Appl. No.: 15/324,276

(22) PCT Filed: Jul. 7, 2015

(86) PCT No.: PCT/EP2015/065507
§ 371 (c)(1),
(2) Date: Jan. 6, 2017

(87) PCT Pub. No.: WO2016/005397
PCT Pub. Date: Jan. 14, 2016

(65) Prior Publication Data
US 2017/0204273 A1 Jul. 20, 2017

(30) Foreign Application Priority Data
Jul. 7, 2014 (GB) .................................. 1412058.8

(51) Int. Cl.
C09D 1/02 (2006.01)
C09D 5/33 (2006.01)
C09D 7/61 (2018.01)
C09D 7/40 (2018.01)

(52) U.S. Cl.
CPC ............... C09D 5/004 (2013.01); C09D 1/02 (2013.01); C09D 7/61 (2018.01); C09D 7/68 (2018.01)

(58) Field of Classification Search
CPC . C09D 5/004; C09D 1/02; C09D 7/61; C09D 7/68
See application file for complete search history.

(56) References Cited

U.S. PATENT DOCUMENTS

| 3,669,699 A | 6/1972 | Doi et al. |
| 3,793,055 A | 2/1974 | Shodai et al. |
| 2004/0194657 A1 | 10/2004 | Lally |
| 2004/0209082 A1* | 10/2004 | Lee .......................... A23G 3/26 428/407 |
| 2006/0142411 A1* | 6/2006 | Ibrahim ................... A61K 8/24 523/109 |
| 2009/0068493 A1* | 3/2009 | Sakakibara ............ C09D 5/082 428/626 |

FOREIGN PATENT DOCUMENTS

| CN | 102119196 A | * | 7/2011 |
| CN | 103756376 A | * | 4/2014 |
| DE | 2131584 A1 | | 12/1971 |
| JP | S55-54356 A | | 4/1980 |
| JP | S62-138563 A | | 6/1987 |
| JP | S62-138564 A | | 6/1987 |
| JP | 2005-171085 A | | 6/2005 |
| JP | 2008-266444 A | * | 11/2008 |
| JP | 2014-094872 A | | 5/2014 |
| WO | WO 92/10546 A1 | | 6/1992 |
| WO | WO 2008/066319 A1 | * | 6/2008 |
| WO | WO 2010/018763 A1 | | 2/2010 |

OTHER PUBLICATIONS

International Search Report for PCT/EP2015/065507, dated Dec. 16, 2015 (5 pages).
Search Report for GB 1412058.8, dated Jan. 5, 2015 (2 pages).

* cited by examiner

Primary Examiner — Anthony J Green
(74) Attorney, Agent, or Firm — Bookoff McAndrews, PLLC (57) ABSTRACT A curable coating composition comprising: (a) a silicate, such as sodium silicate, potassium silicate or lithium silicate; (b) a phosphate, such calcium phosphate, magnesium phosphate or sodium phosphate; and (c) a metal oxide, such as magnesium oxide, aluminum (III) oxide, scandium (III) oxide, yttrium (III) oxide, or zirconium oxide. Such curable coating compositions may be used as non-thermochromic (tailored based on expected operating environment) thermal control coating compositions for application to spacecraft and components thereof. As an alternative metal oxide component, for use in lower temperature applications, or in applications for which thermochromism at elevated temperatures is not a concern, the metal oxide may comprise zinc oxide. Also provided is a curable coating composition comprising: (a) a silicate (e.g. as above); (b) a phosphate (e.g. as above); and (c) a metal sulphate, such as a barium sulphate. Cured coatings are also provided, as are thermal control coatings, thermal control paints, and processes for making coated substrates.

19 Claims, 3 Drawing Sheets

THERMAL CONTROL COATINGS

FIELD OF THE INVENTION

This invention relates to curable coating compositions and cured coatings suitable for use as thermal control coatings for passive cooling applications. Examples of such applications include electronics and radiators for terrestrial applications, as well as space borne systems, including spacecraft, satellites and components thereof.

BACKGROUND TO THE INVENTION

Spacecraft are subjected to a wide range of thermal environments during their service. For example, in use, one side of a spacecraft may face in a direction away from the sun, while another side faces towards the sun. Thermal control is desirable because heat is radiated into space, which cools the spacecraft, but the spacecraft can simultaneously be heated intensively in direct sunlight. Active and passive temperature control techniques are therefore generally used to maintain the interior temperature of the spacecraft, which generally contains persons or sensitive instruments, within acceptable operating limits. Active temperature control may involve machinery or electrical devices, such as electrical heaters and/or coolers. In contrast, passive temperature controls are techniques that do not involve machinery or electrical devices, but include thermal control coatings or structural designs.

One known passive temperature control technique includes use of surface coatings, typically termed thermal control coatings or thermal control paints, on the external surface of the spacecraft. A thermal control coating may be defined as a surface whose thermo-optical properties may be designed in order to achieve a desired surface temperature when subjected to a known solar flux or other source of radiation. A white thermal control paint, for example, has a low solar absorbance, while a black paint has a high solar absorbance. Selective application of such paints to various elements of the spacecraft exterior greatly aids in controlling its temperature.

It is generally recognised that the temperature at the surface of a thermal control coating is dependent on the ratio of the coating's optical absorption to thermal emissivity, which is naturally greatly affected by the material(s) of the coating. It is generally accepted that the beginning of life (BOL) optical properties required for a thermal control coating suitable for use for coating spacecraft, are an optical absorbance (also known as solar absorbance or solar absorptance) ($\alpha_s$) of no greater than 0.20, meaning that less than 20% of the solar radiation impinging on the spacecraft external surface is allowed to be absorbed through to the interior; and a thermal emissivity ($\varepsilon_N$) of no less than 0.80, meaning that at least 80% of the internal heat generated is emitted to the cold vacuum of space.

In addition to passive temperature control, it is desirable for a coating applied to the surface of spacecraft to dissipate electrostatic charges (i.e. to be capable of electrostatic dissipation, ESD) that may develop along the external surface of the spacecraft. Otherwise, the electrostatic charges may accumulate and cause arcing and possible damage to, or interference with, sensitive electronic equipment on or in the spacecraft. In order to dissipate electrostatic charge, the coating must have at least some electrical conductivity. It is generally accepted that it is desirable that coatings capable of electrostatic dissipation (ESD) have volume and surface resistivities of less than about $10^9$ Ωm and $10^9$ Ω/sq respectively.

In addition to thermal control and ESD, a coating suitable for use on spacecraft and spacecraft components should exhibit additional characteristics for spacecraft applications. For example, the coating should be stable during long-term service in a space environment, including the ability to survive micrometeoroid impacts and high levels of radiation exposure. The coating should be moderately tough and flexible so that it does not crack and flake away as it is flexed due to mechanical or thermal strains.

A number of white, electrostatic-dissipative coatings are known for spacecraft use. One of the most well-known coatings is Z-93, developed by the Illinois Institute of Technology Research Institute (IITRI), 10 West 35th Street Chicago, Ill. 60616. Z-93 is a white paint comprising 41.52% zinc oxide (ZnO), 32.05% potassium silicate, and 26.43% de-ionised water. This paint was developed prior to 1964 and has been used as a stable white thermal control coating formulation. Its optical properties of $\alpha_s$=0.18±0.03 and $\varepsilon_N$=0.9±0.05 (G. R. Smolak and N. J Stevens. *Report on the flight performance of the Z-93 white paint used in the SERT 2 thermal control system. Technical report, National Aeronautics and Space Administration (NASA)*, 1971) have rendered it suitable for coating spacecraft.

Although Z-93 has been widely used to coat spacecraft in the past, Z-93 is not without its disadvantages. For example, Z-93 has been reported as being porous, thermochromic, and having less than optimal electrostatic dissipation. The porosity of the Z-93 coating was discussed by William F. Carroll during the 1964 internal NASA conference on spacecraft developments (William F. Carroll. *Coating development and environmental effects. In NASA Conference Proceedings on Spacecraft Coating Developments*, pages 1-9, May 1964), wherein he stated with regard to Z-93 that "The ZnO-Potassium silicate coating is the most stable formulation developed, but, like all non-vitreous inorganic coatings, has adverse physical properties which limit its use. The coating is porous and therefore easily soiled and difficult to reclean. Therefore, use should be limited to applications where surfaces can be easily protected from contamination or where requirements for maximum stability justify extreme precautions for prevention of contamination".

The thermochromic nature of Z-93 is also well recognised, meaning that at high temperatures of greater than about 300° C., the colour of Z-93 changes from white to yellow, as is the case with all zinc oxide based surface treatments. Thermochromism in such coatings can be disadvantageous as an immediate increase in $\alpha_s$ will be observed upon exposure to high temperature, which is undesirable. Additionally, temperature fluctuations in service will result in further instability of $\alpha_s$. In addition, the electrical resistivity (ESD) for Z-93 has been reported as $9.26 \times 10^{15}$ to $3.65 \times 10^{16}$ Ωm (see e.g. page 2-14 of Deshpande & Harada. *Development of Tailorable Electrically Conductive Thermal Control Material Systems, National Aeronautics and Space Administration (NASA)*, June 1998), which is greater than the desired maximum $10^9$ Ωm. In summary, although Z-93 has been used quite successfully as a white thermal control coating on spacecraft, it does have disadvantages.

Variants of Z-93 also exist, for example the white thermal control paint AZ-93 developed by AZ Technology. The product description provided for AZ-93 on the AZ Technology website www.aztechnology.com indicates that, similar to Z-93 discussed above, the solar absorbance and thermal emissivity again render AZ-93 paint suitable for coating spacecraft ($\alpha_s$=0.15±0.01 @≥5 mil (127 micron) thickness; $\varepsilon_N$=0.91±0.02). However, the same disadvantages remain with the AZ-93 coating as discussed above for Z-93 in terms of being porous, thermochromic, and having less than optimal ESD.

It is therefore an object of embodiments of the invention to overcome or mitigate one or more of the disadvantages associated with conventional coatings such as Z-93 or AZ-93.

It is also an object of embodiments of the invention to provide a coating, especially a white thermal control coating, which is operable and stable in a space environment. It is a further object of embodiments of the invention to provide white thermal control coatings which have an optical absorbance ($\alpha_s$) of no greater than 0.20 at ≈100 μm thickness and a thermal emissivity ($\varepsilon_N$) of no less than 0.80 at temperatures up to 500° C., which are also capable of electrostatic dissipation, are less porous than conventional coatings, and which are non-thermochromic at temperatures up to or even greater than 500° C.

SUMMARY OF THE INVENTION

According to a first aspect of the invention, there is provided a curable coating composition comprising:
(a) a silicate;
(b) a calcium phosphate; and
(c) a metal oxide.

Optionally, the curable coating composition comprises:
from about 30% to about 90% by weight of the silicate;
from about 2% to about 60% by weight of the calcium phosphate; and
from about 2% to about 60% by weight of the metal oxide;
the percentages by weight being percentages by weight of the total curable coating composition.

Optionally, the silicate comprises a metal silicate. Suitable metal silicates include alkali metal silicates but are not limited thereto. The silicate optionally comprises an alkali metal silicate, further optionally, an alkali metal silicate selected from sodium silicate, potassium silicate and lithium silicate, or a combination thereof.

The silicate is optionally present in an amount of from about 40% to about 80%, further optionally from about 40% to about 70%, still further optionally from about 50% to about 60%, still further optionally about 50% or about 51% or about 52% or about 53% or about 54% or about 55% or about 56% or about 57% or about 58% or about 59% or about 60%, by weight of the curable coating composition.

In an embodiment, the silicate is present in an amount of about 60% by weight of the curable coating composition. In certain embodiments, the silicate comprises sodium silicate or potassium silicate in an amount of about 60% by weight of the curable coating composition.

In an alternative embodiment, the silicate is present in an amount of about 50% by weight of the curable coating composition. In a certain embodiment, the silicate comprises lithium silicate in an amount of about 50% of the curable coating composition.

Optionally, the calcium phosphate comprises a tricalcium phosphate, a tetracalcium phosphate, hydroxyapatite or a derivative thereof, or a combination thereof. Suitable tricalcium phosphates include α-tricalcium phosphate (α-TCP) and β-tricalcium phosphate (β-TCP), or a combination thereof. In an embodiment, β-TCP is preferred. Optionally, the calcium phosphate has a particle size in the range of from about $0.1 \times 10^{-6}$ m to about $5 \times 10^{-6}$ m. Further optionally the calcium phosphate has a particle size in the range of from about $0.1 \times 10^{-6}$ m to about $1.0 \times 10^{-6}$ m. Even further optionally the calcium phosphate has a particle size in the range of from about $0.2 \times 10^{-6}$ m to about $0.5 \times 10^{-6}$ m.

As used herein the term "derivative" of hydroxyapatite is intended to mean calcium phosphates which are non-stoichiometric as opposed to hydroxyapatite having the formula $Ca_{10}(PO_4)_4(OH)$. Optionally, the calcium phosphate may be doped with additional metal ions, such as zinc, magnesium, strontium, iron, aluminium, lanthanide elements or silicon.

The calcium phosphate is optionally present in an amount of from about 5% to about 40%, further optionally from about 8% to about 20%, still further optionally from about 10% to about 15%, even further optionally from about 10% to about 12.5%, even further optionally about 10% or about 11% or about 12% or about 12.5%, by weight of the curable coating composition.

In an embodiment, the calcium phosphate is present in an amount of about 10% by weight of the curable coating composition. In a certain embodiment, the calcium phosphate comprises β-TCP in an amount of about 10% by weight of the curable coating composition.

In an alternative embodiment, the calcium phosphate is present in an amount of about 12.5% by weight of the curable coating composition. In a certain embodiment, the calcium phosphate comprises β-TCP in an amount of about 12.5% by weight of the curable coating composition.

Optionally, the metal oxide comprises an oxide of magnesium, aluminium, scandium, yttrium, zirconium, lanthanum, praseodymium, neodymium, samarium, europium, gadolinium, terbium, dysprosium, holmium, thulium, ytterbium or lutetium, or a combination thereof.

Still further optionally, the metal oxide comprises magnesium oxide, aluminium (III) oxide, scandium (III) oxide, yttrium (III) oxide or zirconium oxide; even further optionally, scandium (III) oxide, yttrium (III) oxide or zirconium oxide; even further optionally scandium (III) oxide or yttrium (III) oxide; still further optionally yttrium (III) oxide. Alternatively, the metal oxide may comprise zinc oxide, ZnO (which, although thermochromic above around 300° C., is non-thermochromic at lower temperatures; coating compositions which include ZnO therefore have particular use in low temperature applications (below around 300° C.), or in higher temperature applications for which thermochromism is not a concern). Optionally, the metal oxide has a particle size in the range of from about $0.1 \times 10^{-6}$ m to about $5 \times 10^{-6}$ m.

The metal oxide is optionally present in an amount of from about 10% to about 50%, further optionally from about 20% to about 40%, still further optionally from about 25% to about 40%, even further optionally from about 30% to about 40%, even further optionally from about 30% to about 37.5%, even further optionally about 30% or about 31% or about 32% or about 33% or about 34% or about 35% or about 36% or about 37% or about 37.5%, by weight of the curable coating composition.

In an embodiment, the metal oxide is present in an amount of about 30% by weight of the curable coating composition. In a certain embodiment, the metal oxide comprises yttrium (III) oxide in an amount of about 30% by weight of the curable coating composition.

In an alternative embodiment, the metal oxide is present in an amount of about 37.5% by weight of the curable coating composition. In a certain embodiment, the metal oxide comprises yttrium (III) oxide in an amount of about 37.5% by weight of the curable coating composition.

Optionally, the metal oxide is non-thermochromic at a temperature of greater than 300° C.

Preferably, the metal oxide is non-thermochromic at a temperature of up to or even greater than 500° C.

As used herein, the term "thermochromic" refers to a colour change upon increase of temperature. The colour change is generally reversible.

Optionally, the curable coating composition is a liquid curable coating composition.

Optionally, the curable coating composition is a curable thermal control coating composition.

According to a second aspect of the invention there is provided a curable coating composition comprising:
(a) a silicate;
(b) a phosphate; and
(c) a metal oxide.

Examples and options for the silicate, phosphate and metal oxide species are as mentioned above in relation to the first aspect of the invention. The phosphate species may alternatively be another alkali phosphate preferably one which is white in colour, such as magnesium phosphate or sodium phosphate.

According to a third aspect of the invention, there is still further provided a curable coating composition comprising:
(a) a silicate;
(b) a calcium phosphate; and
(c) a metal sulphate.

Optionally, the curable coating composition comprises:
from about 30% to about 90% by weight of the silicate;
from about 2% to about 60% by weight of the calcium phosphate; and
from about 2% to about 60% by weight of the metal sulphate;
the percentages by weight being percentages by weight of the total curable coating composition.

Optionally, the metal sulphate comprises a barium sulphate. Optionally, the amount of the metal sulphate present in the curable coating composition is as defined above for the metal oxide.

According to a fourth aspect of the invention there is also provided a thermal control coating comprising the curable coating composition according to the first, second or third aspects of the invention.

According to a fifth aspect of the invention there is also provided a white thermal control paint comprising the curable coating composition according to the first, second or third aspects of the invention.

According to a sixth aspect of the invention there is also provided the use of a curable coating composition according to the first, second or third aspects of the invention as a non-thermochromic thermal control coating composition for application to spacecraft and components thereof.

According to a seventh aspect of the invention, there is also provided a cured coating produced by curing the curable coating composition according to the first, second or third aspects of the invention.

According to an eighth aspect of the invention, there is further provided a cured coating comprising:
(a) a silicate;
(b) a calcium phosphate; and
(c) a metal oxide.

Optionally, the cured coating comprises:
from about 8% to about 80% by weight of the silicate;
from about 5% to about 70% by weight of the calcium phosphate; and
from about 5% to about 70% by weight of the metal oxide;
the percentages by weight being percentages by weight of the total cured coating.

Optionally, the silicate is as defined above for the curable coating composition.

The silicate is optionally present in an amount of from about 10% to about 70%, further optionally from about 10% to about 60%, still further optionally from about 15% to about 50%, still further optionally from about 20% to about 40%, even further optionally about 20% to about 37%, even further optionally about 20% or about 21% or about 22% or about 23% or about 24% or about 25% or about 26% or about 27% or about 28% or about 29% or about 30% or about 31% or about 32% or about 33% or about 34% or about 35% or about 36% or about 37%, by weight of the cured coating.

In certain embodiments, the silicate is present in an amount of about 22% or about 36% or about 37% by weight of the cured coating. In an embodiment, the silicate comprises sodium silicate in an amount of about 36% by weight of the cured coating. In a further embodiment, the silicate comprises potassium silicate in an amount of about 37% by weight of the cured coating. In a still further embodiment, the silicate comprises lithium silicate in an amount of about 22% of the cured coating.

Optionally, the calcium phosphate is as defined above for the curable coating composition.

The calcium phosphate is optionally present in an amount of from about 5% to about 60%, further optionally from about 10% to about 50%, still further optionally from about 10% to about 40%, still further optionally from about 10% to about 30%, still further optionally from about 12% to about 20%, still further optionally from about 15% to about 20%, even further optionally about 15% or about 16% or about 17% or about 18% or about 19%, by weight of the cured coating.

In certain embodiments, the calcium phosphate is present in an amount of about 16% or about 19% by weight of the cured coating. In an embodiment, the calcium phosphate comprises β-TCP in an amount of about 16% by weight of the cured coating. In a further embodiment, the calcium phosphate comprises β-TCP in an amount of about 16% by weight of the cured coating. In a still further embodiment, the calcium phosphate comprises 3-TCP in an amount of about 19% of the cured coating.

Optionally, the metal oxide is as defined above for the curable coating composition.

The metal oxide is optionally present in an amount of from about 10% to about 70%, further optionally from about 20% to about 65%, still further optionally from about 30% to about 60%, still further optionally from about 40% to about 60%, still further optionally from about 45% to about 60%, even further optionally from about 47% to about 59%, even further optionally about 47% or about 48% or about 49% or about 50% or about 51% or about 52% or about 53% or about 54% or about 55% or about 56% or about 57% or about 58% or about 59%, by weight of the cured coating.

In certain embodiments, the metal oxide is present in an amount of about 48% or about 47% or about 58% by weight of the cured coating. In an embodiment, the metal oxide comprises yttrium (III) oxide in an amount of about 48% by weight of the cured coating. In a further embodiment, the metal oxide comprises yttrium (III) oxide in an amount of about 47% by weight of the cured coating. In a still further embodiment, the metal oxide comprises yttrium (III) oxide in an amount of about 58% of the cured coating.

Optionally the phosphate species is present in an amount of from about 10% to about 25% by volume; further optionally from about 15% to about 20% by volume; further optionally about 18% by volume, or about 19% by volume. More particularly, a total volume fraction of the phosphate species within the coating composition of around 18-19 vol % has been determined as giving a good level of electrical conductivity without undue detriment to the optical properties of the coating.

According to a ninth aspect of the invention, there is further provided a cured coating comprising:
(a) a silicate;
(b) a phosphate; and
(c) a metal oxide.

Examples and options for the silicate, phosphate and metal oxide species are as mentioned above in relation to the second and eighth aspects of the invention. Thus, the phosphate species may be an alkali phosphate other than calcium phosphate—for example magnesium phosphate or sodium phosphate.

According to a tenth aspect of the invention, there is also provided a cured coating comprising:
(a) a silicate;
(b) a calcium phosphate; and
(c) a metal sulphate.

Optionally, the cured coating comprises:
from about 8% to about 80% by weight of the silicate;
from about 5% to about 70% by weight of the calcium phosphate; and
from about 5% to about 70% by weight of the metal sulphate;
the percentages by weight being percentages by weight of the total cured coating.

More generally, optionally the cured coating may be formed from a curable coating composition according to the first, second and third aspects of the invention. Thus, the first, second and third aspects of the invention conveniently provide curable coating compositions for forming the cured coatings of the seventh, eighth, ninth and tenth aspects of the invention.

Optionally, the cured coating is a thermal control coating. Thus, a further aspect of the invention provides a thermal control coating comprising the cured coating according to the seventh, eighth, ninth or tenth aspects of the invention.

According to a further aspect of the invention there is also provided a cured white thermal control paint comprising the cured coating according to the seventh, eighth, ninth or tenth aspects of the invention.

According to a further aspect of the invention there is also provided the use of a cured coating according to the seventh, eighth, ninth or tenth aspects of the invention as a non-thermochromic thermal control coating for spacecraft and components thereof.

According to a further aspect of the invention, there is also provided a coated substrate comprising a substrate and a curable coating composition according to the first, second or third aspects of the invention provided thereon.

According to a further aspect of the invention, there is also provided a coated substrate comprising a substrate and a cured coating according to the seventh, eighth, ninth or tenth aspects of the invention provided thereon.

Optionally, the substrate comprises an aluminium substrate, a magnesium substrate, a titanium substrate or a plastic substrate. Further optionally, the substrate may be a composite such as a carbon-fibre reinforced plastic (CFRP) substrate. The fibre reinforcement may consist of or comprise glass or basalt fibres.

According to a further aspect of the invention, there is also provided a process for making a coated substrate comprising a substrate and a curable coating composition according to the first, second or third aspects of the invention, comprising applying to a substrate a curable coating composition according to the first, second or third aspects of the invention.

According to a further aspect of the invention, there is also provided a process for making a coated substrate comprising a substrate and a cured coating according to the seventh, eighth, ninth or tenth aspects of the invention, comprising applying to a substrate a curable coating composition according to the first, second or third aspects of the invention, and curing the curable coating composition.

Optionally, the curable coating composition is applied to the substrate by spraying.

Optionally, prior to curing the curable coating composition, the curable coating composition is dried.

Optionally the silicate is produced using a sol-gel process. The use of a sol-gel process enables the use of a lower curing temperature, as well as a longer duration room temperature cure. Furthermore, a sol-gel is more resistant to moisture and high humidity. Low moisture resistance is a known aspect of certain (alkali-based) silicates, so a sol-gel derived silicate is an advantageous alternative. It may be used as a top coat.

Other optional features, aspects and embodiments of the invention are set out in the appended claims.

Embodiments of the invention provide the following advantages:

The cured coatings of embodiments of the invention are opaque, white, reflective coatings which are suitable for use as white thermal control coatings for coating spacecraft and components thereof. The use of both yttrium (III) oxide and β-TCP in the coatings provides for opacity and for reflectance across the whole UV-Vis-NIR spectrum.

The solar absorbance and thermal emissivity of the cured coatings are excellent ($\alpha_s$=from about 0.13 to about 0.16 at 100 μm thickness; $\varepsilon_N$=0.88-0.92).

The cured coatings of embodiments of the invention are less porous than conventional coatings. Lower porosity allows for greater robustness and resistance to contamination etc. It is proposed that the use of a calcium phosphate, optionally β-TCP, enables a cured thermal control coating to be produced which is less porous than conventional coatings.

The reduced porosity of the coating is indicative of greater encapsulation of the pigment within the coating. This provides protection of the pigments (e.g. metal oxide and calcium phosphate) against atomic oxygen attack, x-ray and electron and proton degradation.

The cured coatings of embodiments of the invention are non-thermochromic to up to 1000° C. In contrast, Z-93 exhibits a significant colour change at 300° C. For example, Table 5 of Kamalisarvestani et al, "*Performance, materials and coating technologies of thermochromic thin films on smart windows*", Renewable and Sustainable Energy Reviews 26 (2013) 353-364, shows that zinc oxide (contained within Z-93 and AZ-93), turns from white to yellow when heated. Furthermore, Jesse H. Day stated on page 649 of his publication "*Thermochromism of Inorganic Compounds*", Chemical Reviews, Volume 68, Number 6, Nov. 25, 1968, that "Not entirely reversible changes were those of zinc oxide, which turned a light yellowish green, and tin oxide, which went from white to green and even to orange and red-orange, returning on cooling to a greenish white". It is proposed that the use of a metal oxide other than zinc oxide, optionally yttrium (III) oxide, enables a thermal control coating to be produced which is non-thermochromic.

The electrical resistivity (ESD) for each of SWN79, SWK66 and SWL40 (see Example 1 below) was determined to be $10^6$ Ωm, in contrast to the resistivity of the order of $10^{15}$ to $10^{16}$ Ωm noted for Z-93 and AZ-93.

The cured coatings of embodiments of the invention are UV reflective, whereas Z-93 and variants thereof absorb UV radiation.

The cured coatings of embodiments of the invention can be carbon-free. This is advantageous since any residual carbon present in the coating can give rise to issues in space. Indeed, some space missions are simply too hot for organic molecules to survive. Under intense radiation bombardment, organic molecules can become fragmented and may vaporise and outgas. This process can alter the structure of the coating and represents a potential variation in the coating over time, which is generally to be avoided. For example, organic molecules will absorb strongly in the Vacuum Ultraviolet (VUV) and Ultraviolet (UV) wavelengths, accelerating the degradation of the material when exposed to solar radiation, and also giving rise to surface contamination. In particular, VUV radiation carries enough energy to sever H—C bonds, usually leaving carbon behind, which will ruin the optical properties of the coating. In addition, the outgassed material may also condense on nearby surfaces or components and may thus contaminate sensitive optical or other components and thereby damage the overall device.

BRIEF DESCRIPTION OF THE DRAWINGS

Embodiments of the invention will now be described, by way of example only, and with reference to the drawings in which.

DETAILED DESCRIPTION OF PREFERRED EMBODIMENTS

The present embodiments represent the best ways known to the applicants of putting the invention into practice. However, they are not the only ways in which this can be achieved.

Initial Overview

The present work provides a variety of curable coating compositions, each comprising: (a) a silicate, such as (but not limited to) sodium silicate, potassium silicate or lithium silicate; (b) a phosphate, such as (but not limited to) calcium phosphate, magnesium phosphate or sodium phosphate; and (c) a metal oxide, such as (but not limited to) magnesium oxide, aluminium (III) oxide, scandium (III) oxide, yttrium (III) oxide or zirconium oxide. Such curable coating compositions may be used as non-thermochromic thermal control coating compositions for application to spacecraft and components thereof.

In terms of thermal control, such coating compositions provide thermal control from a 'passive cooling' standpoint, i.e. through low absorbance and high emissivity, as is particularly suited to space applications. The key heat transfer mechanism is via radiation. As those skilled in the art will appreciate, this radiative aspect renders the present coatings fundamentally different from flame-retardant or heat-resistant type coatings, which are based on the principle of preventing combustion (which is not an issue in the vacuum of space).

Alternatively, for use in low temperature applications, or in applications for which thermochromism at elevated temperatures (above around 300° C.) is not a concern, the metal oxide species may be zinc oxide (zinc oxide being thermochromic at temperatures above around 300° C.).

Also provided are a variety of curable coating compositions, each comprising: (a) a silicate (e.g. as above); (b) a phosphate (e.g. as above); and (c) a metal sulphate, such as a barium sulphate.

Thermal control coatings, thermal control paints, and processes for making coated substrates are also provided.

Example 1

Curable coating compositions according to embodiments of the invention, which we refer to as SWN79, SWK66 and SWL40, were prepared in accordance with the m (wet %) of ingredients shown under Formulation A of Table 1.

TABLE 1

|  | m (wet %) | m (dry %) | V (dry %) |
|---|---|---|---|
| FORMULATION A | | | |
| SWN79 | | | |
| Y2O3 | 30.00 | 47.81 | 33.10 |
| TCP | 10.00 | 15.94 | 17.64 |
| N79 | 60.00 | 36.26 | 49.27 |
| SWK66 | | | |
| Y2O3 | 30.00 | 47.30 | 32.59 |
| TCP | 10.00 | 15.77 | 17.37 |
| K66 | 60.00 | 36.94 | 50.04 |
| SWL40 | | | |
| Y2O3 | 37.50 | 58.25 | 43.89 |
| TCP | 12.50 | 19.42 | 23.39 |
| L40 | 50.00 | 22.33 | 32.73 |
| FORMULATION B | | | |
| N79 Min | | | |
| Y2O3 | 7.50 | 17.00 | 9.56 |
| TCP | 2.50 | 5.67 | 5.09 |
| N79 | 90.00 | 77.34 | 85.35 |
| K66 Min | | | |
| Y2O3 | 7.50 | 16.61 | 9.31 |
| TCP | 2.50 | 5.54 | 4.96 |
| K66 | 90.00 | 77.85 | 85.73 |
| L40 Min | | | |
| Y2O3 | 15.00 | 39.06 | 25.52 |
| TCP | 5.00 | 13.02 | 13.60 |
| L40 | 80.00 | 47.92 | 60.89 |
| FORMULATION C | | | |
| N79 Low | | | |

TABLE 1-continued

| | m (wet %) | m (dry %) | V (dry %) |
|---|---|---|---|
| Y2O3 | 15.00 | 29.80 | 18.17 |
| TCP | 5.00 | 9.93 | 9.68 |
| N79 | 80.00 | 60.27 | 72.14 |
| K66 Low | | | |
| Y2O3 | 15.00 | 29.27 | 17.77 |
| TCP | 5.00 | 9.76 | 9.47 |
| K66 | 80.00 | 60.97 | 72.76 |
| L40 Low | | | |
| Y2O3 | 26.25 | 52.55 | 37.87 |
| TCP | 8.75 | 17.52 | 20.18 |
| L40 | 65.00 | 29.93 | 41.95 |
| FORMULATION D | | | |
| N79 High | | | |
| Y2O3 | 37.5 | 54.38 | 39.60 |
| TCP | 12.5 | 18.13 | 21.10 |
| N79 | 50.0 | 27.49 | 39.30 |
| K66 High | | | |
| Y2O3 | 37.5 | 53.94 | 39.12 |
| TCP | 12.5 | 17.98 | 20.85 |
| K66 | 50.0 | 28.08 | 40.04 |
| L40 High | | | |
| Y2O3 | 30.0 | 55.76 | 41.19 |
| TCP | 10.0 | 18.59 | 21.95 |
| L40 | 60.0 | 25.65 | 36.86 |
| FORMULATION E | | | |
| N79 Max | | | |
| Y2O3 | 45.00 | 59.87 | 45.57 |
| TCP | 15.00 | 19.96 | 24.28 |
| N79 | 40.00 | 20.18 | 30.15 |
| K66 Max | | | |
| Y2O3 | 45.00 | 59.51 | 45.14 |
| TCP | 15.00 | 19.84 | 24.06 |
| K66 | 40.00 | 20.66 | 30.80 |
| L40 Max | | | |
| Y2O3 | 52.50 | 68.27 | 55.91 |
| TCP | 17.50 | 22.76 | 29.80 |
| L40 | 30.00 | 8.97 | 14.29 |
| FORMULATION F | | | |
| N79 Min | | | |
| Y2O3 | 2.50 | 5.67 | 3.07 |
| TCP | 7.50 | 17.00 | 14.72 |
| N79 | 90.00 | 77.34 | 82.22 |
| K66 Min | | | |
| Y2O3 | 2.50 | 5.54 | 2.99 |
| TCP | 7.50 | 16.61 | 14.35 |
| K66 | 90.00 | 77.85 | 82.66 |
| L40 Min | | | |
| Y2O3 | 5.00 | 13.02 | 7.72 |
| TCP | 15.00 | 39.06 | 37.02 |
| L40 | 80.00 | 47.92 | 55.26 |
| FORMULATION G | | | |
| N79 Low | | | |
| Y2O3 | 5.00 | 9.93 | 5.65 |
| TCP | 15.00 | 29.80 | 27.09 |
| N79 | 80.00 | 60.27 | 67.26 |
| K66 Low | | | |
| Y2O3 | 5.00 | 9.76 | 5.53 |
| TCP | 15.00 | 29.27 | 26.53 |
| K66 | 80.00 | 60.97 | 67.94 |
| L40 Low | | | |
| Y2O3 | 8.75 | 17.52 | 10.97 |
| TCP | 26.25 | 52.55 | 52.59 |
| L40 | 65.00 | 29.93 | 36.44 |
| FORMULATION H | | | |
| SWN79 | | | |
| Y2O3 | 10.00 | 15.94 | 9.74 |
| TCP | 30.00 | 47.81 | 46.74 |
| N79 | 60.00 | 36.26 | 43.52 |
| SWK66 | | | |
| Y2O3 | 10.00 | 15.77 | 9.61 |
| TCP | 30.00 | 47.30 | 46.11 |
| K66 | 60.00 | 36.94 | 44.28 |
| SWL40 | | | |
| Y2O3 | 12.50 | 20.33 | 13.18 |
| TCP | 37.50 | 60.98 | 63.23 |
| L40 | 50.00 | 18.70 | 23.59 |
| FORMULATION I | | | |
| N79 High | | | |
| Y2O3 | 12.5 | 18.13 | 11.40 |
| TCP | 37.5 | 54.38 | 54.67 |
| N79 | 50.0 | 27.49 | 33.93 |
| K66 High | | | |
| Y2O3 | 12.5 | 17.98 | 11.28 |
| TCP | 37.5 | 53.94 | 54.09 |
| K66 | 50.0 | 28.08 | 34.63 |
| L40 High | | | |
| Y2O3 | 10.0 | 18.59 | 11.79 |
| TCP | 30.0 | 55.76 | 56.55 |
| L40 | 60.0 | 25.65 | 31.65 |
| FORMULATION J | | | |
| N79 Max | | | |
| Y2O3 | 15.00 | 19.96 | 12.85 |
| TCP | 45.00 | 59.87 | 61.64 |
| N79 | 40.00 | 20.18 | 25.51 |
| K66 Max | | | |
| Y2O3 | 15.00 | 19.84 | 12.75 |
| TCP | 45.00 | 59.51 | 61.15 |
| K66 | 40.00 | 20.66 | 26.10 |
| L40 Max | | | |
| Y2O3 | 17.50 | 22.76 | 15.24 |
| TCP | 52.50 | 68.27 | 73.08 |
| L40 | 30.00 | 8.97 | 11.69 |

In Table 1:
Y2O3 is $Y_2O_3$, i.e. yttrium (III) oxide, also known as yttria, available from H C Starck, Im Schleeke 91, 38642 Goslar, Germany;
TCP is β-TCP i.e. (β-$Ca_3(PO_4)_2$), available from Sigma Aldrich, St. Louis, MO, USA;
N79 is sodium silicate, namely [3.22 $SiO_2$/NaO] $Na_2SiO_3 \cdot xH_2O$, available from PQ Corporation, 1700 Kansas Ave, Kansas City, KS 66105, USA;
K66 is potassium silicate, namely [2.18 $SiO_2$/KO] $K_2SiO_3 \cdot xH_2O$, available from PQ Corporation, details provided above; and
L40 is lithium silicate, namely [8.20 $SiO_2$/LiO] $Li_2SiO_3 \cdot xH_2O$, available from PQ Corporation, details provided above.

It will be appreciated by a skilled person that the x used in formulae of the silicates indicates the amount of water. It will also be appreciated by a skilled person that the silicates used are not limited to the exact formulae indicated above.

SWN79

A curable coating composition (SWN79 in Formulation A of Table 1) was prepared using sodium silicate as a liquid binder phase. The yttrium (III) oxide and β-TCP powders were mixed in a 3:1 ratio by weight to make up the powder component of the curable coating composition, in accordance with the m (wet %) shown in Table 1 for Formulation A. The silicate was then mixed with the yttrium (III) oxide and β-TCP powders in a 60:40 ratio by weight, again in accordance with the m (wet %) shown in Table 1 for Formulation A. Specifically, the powder charge (yttrium (III) oxide and β-TCP) was added to approximately one quarter of the total liquid silicate phase. Once the powder component had been added, the remaining liquid phase was stirred into the blend as it is added. The final blend was added to a sealed vessel and the mixture was turned on a roller-ball mill for 2 hours, to form the curable coating composition of an embodiment of the invention. The whole mixing process was carried out at a temperature of 20° C. and a relative humidity of 50% (standard laboratory conditions).

SWK66

A curable coating composition (SWK66 in Formulation A of Table 1) was prepared using potassium silicate as a liquid binder phase. The process was carried out as described above for SWN79, except that potassium silicate was used instead of sodium silicate.

SWL40

A curable coating composition (SWL40 in Formulation A of Table 1) was prepared using lithium silicate as a liquid binder phase. The process was carried out as described above for SWN79, except that lithium silicate was used instead of sodium silicate, and the silicate was mixed with the yttrium (III) oxide and β-TCP powders in a 50:50 ratio by weight, in accordance with the m (wet %) shown in Table 1 for Formulation A.

Each of SWN79, SWK66 and SWL40 was a viscous, aqueous solution.

Curable coating compositions were also prepared in accordance with Formulations B-J.

Example 2

Curable coating compositions, namely cured SWN79, SWK66 and SWL40, according to embodiments of the invention, were deposited onto metal samples and cured as follows.

Cured SWN79

After mixing using the roller-ball mill as described in Example 1, the liquid SWN79 composition was sprayed onto the surface of a Grade V titanium (Ti6Al4V) substrate using a Trilogy™ AS spray gun, available from Nordson Corporation (Westlake, Ohio, USA). Spraying was carried out at a distance of 25 cm from the target surface until a coverage of 100 μm thickness was achieved. After spraying, the sprayed surface was covered with, but not in contact with, aluminium foil and allowed set overnight, i.e. for 12 to 16 hours at a temperature of 20° C. At this stage, the surface was no longer glossy in appearance, and the sample was transferred to a conventional fan assisted oven. The sample was heated to 250° C. in the oven as per the following thermal (cure) cycle:

Heat from room temperature (20° C. approx.) at 0.5° C./min to 95° C.
Hold at 95° C. for 2 hours
Heat from 95° C. at 0.5° C./min to 120° C.
Hold at 120° C. for 2 hours
Heat from 120° C. at 0.5° C./min to 150° C.
Hold at 150° C. for 2 hours
Heat from 150° C. at 0.5° C./min to 180° C.
Hold at 180° C. for 12 hours
Heat from 180° C. at 0.5° C./min to 250° C.
Hold at 250° C. for 2 hours Once the cure cycle was complete, the sample was allowed to cool to a temperature of 20° C. at the same rate as the oven (approximately 0.5° C./min).

After the curing process was complete, the cured coating was a hard, inorganic film, of 100 μm thickness. The cured coating had a composition as indicated in m (dry %) for Formulation A in Table 1.

Cured SWK66 and Cured SWL40

Cured SWK66 and Cured SWL40 were prepared by application to a Grade V titanium substrate, drying and curing, as described for SWN79 above. The cured coatings had respective composition as indicated in m (dry %) for Formulation A in Table 1.

Cured coatings were also prepared using the curable coating compositions formed using Formulations B-J.

Example 3

The attributes of the substrates coated with cured SWN79, cured SWK66 and cured SWL40, prepared in Example 2, were investigated as described below.

(A) Optical Absorbance

The diffuse reflectance R of the cured coatings SWN79 and SWL40 present on the titanium substrates prepared in Example 2 was measured in the UV/Vis/NIR range (250-2500 nm) using a Perkin Elmer Lambda 9/19 double beam spectrophotometer with a 150 mm integrating sphere attachment. Diffuse reflectance was measured against a Spectralon® reference to produce a reflectance trace (not shown) which was weighted against the Air Mass Zero (ASTM E490) solar irradiance spectrum. As the coated substrates were opaque, solar absorbance $α_s$ is simply: 1-R. The results are shown in Table 2.

TABLE 2

| Cured SWN79 | | Cured SWL40 | |
|---|---|---|---|
| $α_s$ (%) | thickness | $α_s$ (%) | thickness |
| 17.3 | 120 μm | 13.5 | 90 μm |

Thus, the solar absorbance of the cured coatings SWN79 and SWL40 was found to be excellent, having $α_s$ of no greater than 0.2 (i.e. $α_s$ (%) no greater than 20%).

(B) Thermal Emissivity

Surface emissivity measurements of the coatings were carried out to ECSS Standard (ECSS-Q-ST-70-09C). Measurements were taken using a Jenoptik VarioCam IR camera. Samples were placed on a hot plate with known emissivity reference samples. The hot plate temperature was measured using a Type K thermocouple that was embedded in another sample that was on the hotplate. Thermocouple readings were used in conjunction with the infra-red camera software to obtain emissivity data for the coatings tested. The IR camera and the thermocouple measurements were subsequently recorded over a set duration. During post processing the most stable portion of the temperature measurement graph (not shown) was used to determine the max and min temperature variation.

The mean temperature was used to calculate the emissivity for each particular sample through the IR camera software.

Emissivity values ($ε_N$) of 0.88-0.92, were obtained for all coatings SWN79, SWK66 and SWL40.

(C) Thermochromism

The solar absorptance of the samples (i.e. substrates coated with cured SWN79, cured SWK66 and cured SWL40) was measured subsequent to outgassing testing in ESA's XTES Facility (ESTEC, Noordwijk, The Netherlands). The samples were then added to ESA's Synergistic Temperature-Accelerated Radiation (STAR-II) Facility, where $\alpha_s$ was remeasured at 500° C. under $10^{-6}$ mbar atmospheric pressure. Any thermochromic effects would appear as a change in solar absorptance or $\Delta\alpha$. Beginning of test (BOT) STAR-II Facility measurements indicated a $\Delta\alpha$ of 0.00±0.02 when compared with XTES values, which were recorded at room temperature. This indicates that the $\alpha_s$ is independent of temperatures up to 500° C. and therefore demonstrated that the samples were not thermochromic.

As a further test, separate samples of the components yttrium (III) oxide, β-TCP and zinc oxide (ZnO), all white powders, were heated to 300° C. in a Carbolite 1100 electric furnace. The resultant samples were visually examined at 300° C. and the differences were clear to the naked eye (results not shown). The zinc oxide had become discoloured from white to a yellow colour upon being heated. In contrast, yttrium (III) oxide and β-TCP, being components of the cured coatings of certain embodiments of the invention, showed no discolouration and remained white. Accordingly, the components of the cured coatings of certain embodiments of the invention may advantageously be non-thermochromic.

(D) Porosity

Figure 1:
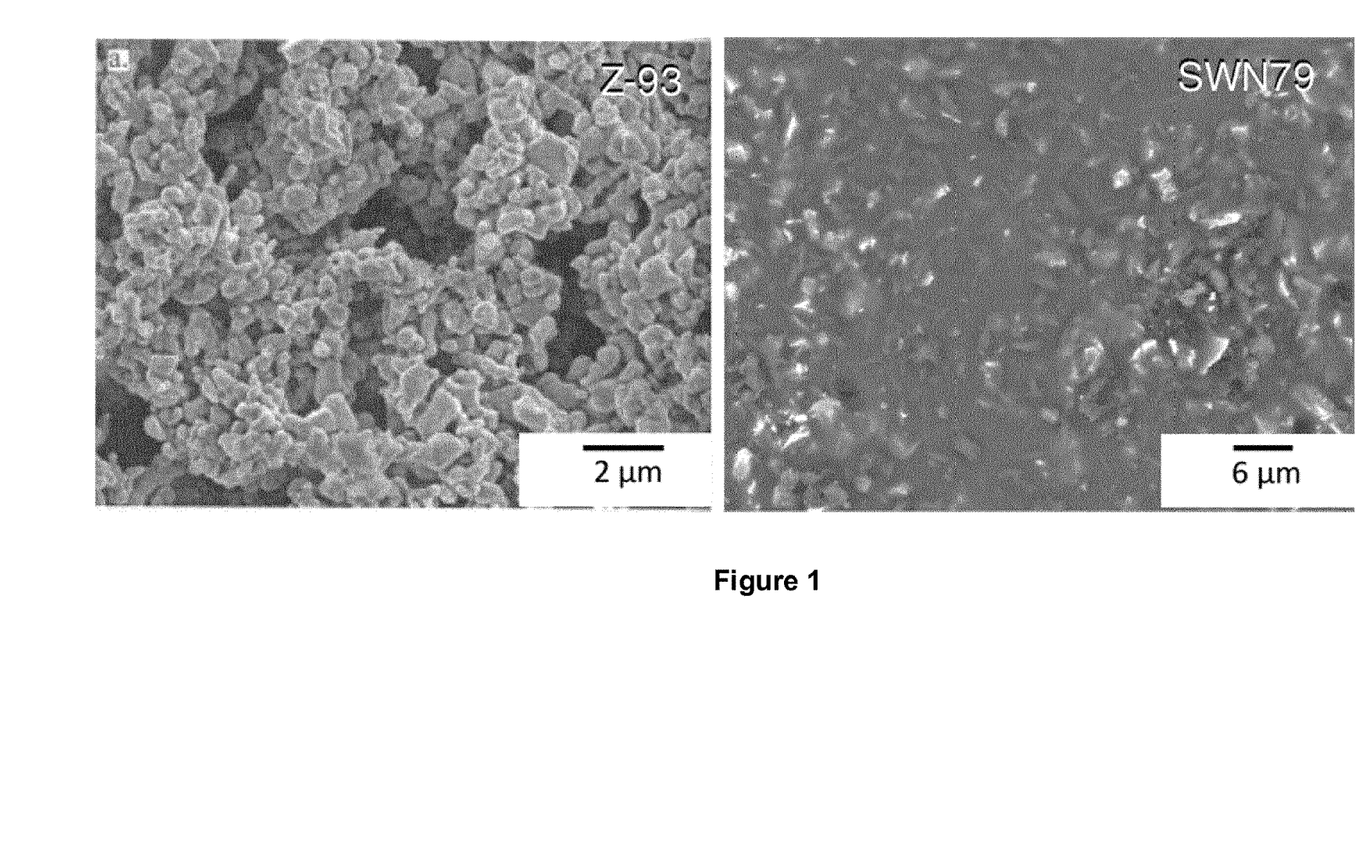
FIG. 1 shows scanning electron micrograph (SEM) images of a cured coating of Z-93 and a cured coating of our SWN79 composition, as described in more detail in Example 3(D) relating to porosity.

The cured coating SWN79 present on Grade V (Ti-6Al-4V) titanium prepared in Example 2, and a cured coating of Z-93, also applied to a titanium substrate and cured in the same way as described in Example 2, were visually examined and the differences were clear to the naked eye. The sample of SWN79 was smooth whereas the sample of Z-93 was visibly porous. FIG. 1 depicts electron microscope (SEM) images for Z-93 (left) and SWN79 (right) which clearly shows that the Z-93 sample is highly porous, while the SWN79 sample produces a solid and uniform surface.

Figure 2:
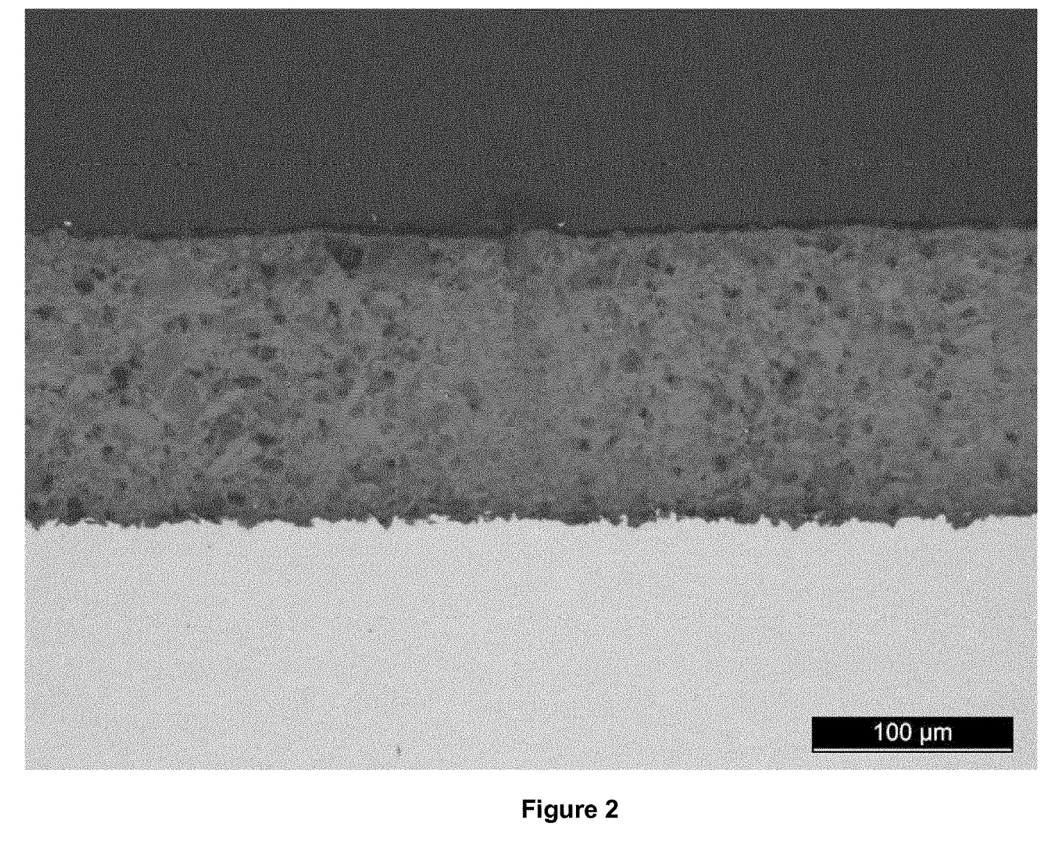
FIG. 2 shows a high magnification optical microscopy cross section image of SWN79 showing no evidence of porosity (top layer: mounting resin; middle layer: SWN79 coating; bottom layer: titanium substrate)

A further representation of the SWN79 sample is shown in FIG. 2. The sample was sectioned, mounted and polished and examined using optical microscopy. As is evident from the image shown in FIG. 2 (top layer: mounting resin; middle layer: SWN79 coating; bottom layer: titanium substrate), SWN79 shows 0% porosity when examined using optical microscopy. As such, the SWN79 sample produced a solid and non-porous surface at all magnifications tested.

(E) Electrical Resistivity (Electrostatic Dissipation, ESD)

Surface resistivity of each of the cured coatings, namely cured SWN79, cured SWK66 and cured SWL40, was measured by applying the respective curable coating composition prepared in Example 1 to an insulating substrate (glass) and curing as detailed in Example 2. A concentric ring resistivity probe was placed on the coated surface and attached to an insulating Fluke 1507 test meter. The surface resistivity was recorded over a range of voltages from 50 to 1000 Volts.

The electrical resistivity for each of SWN79, SWK66 and SWL40 was determined to be of the order $10^6$ Ωm.

(F) UV Reflectance

Figure 3:
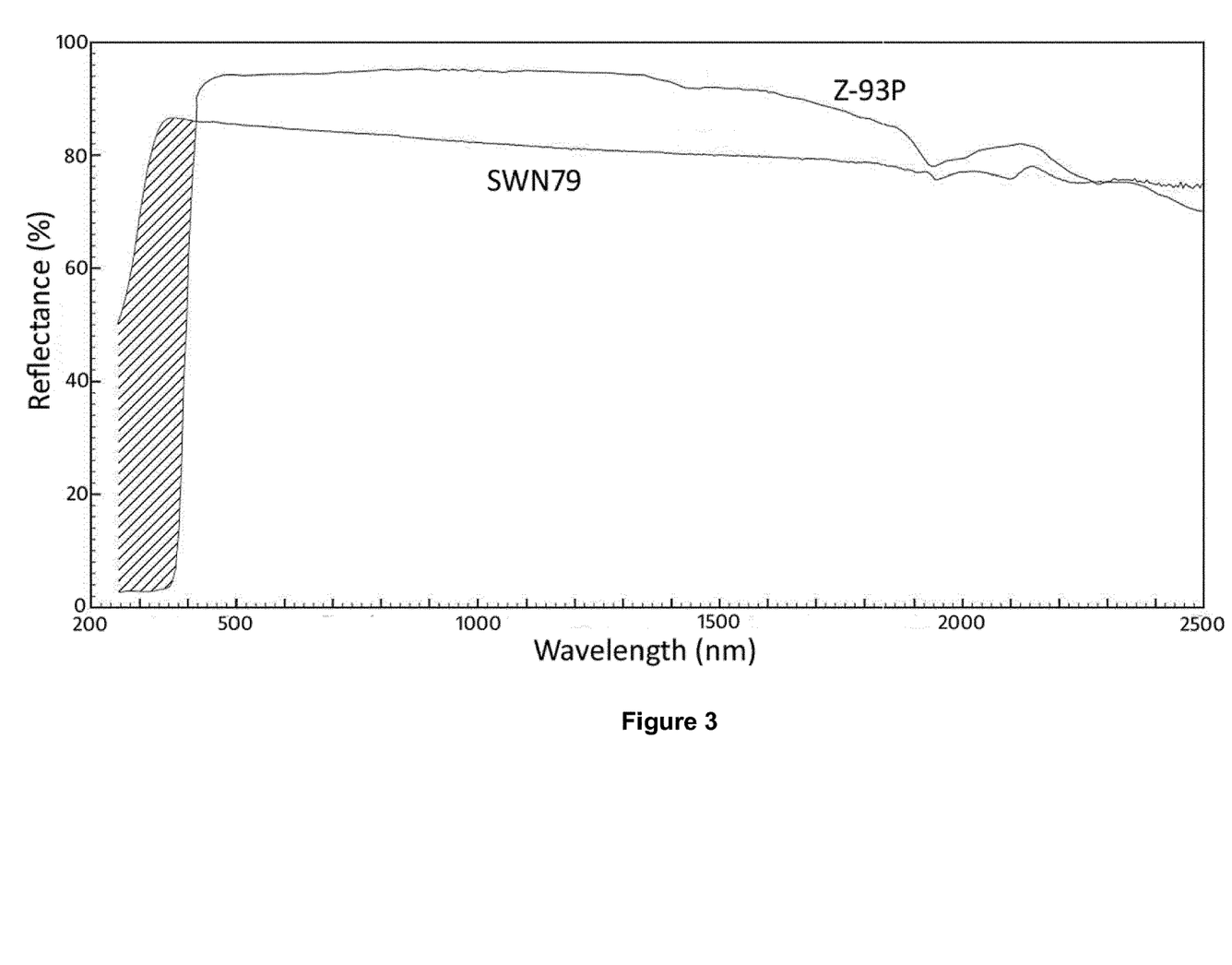
FIG. 3 shows reflectance curves of SWN79 and Z-93 between 250 and 2500 nm wavelength. SWN79 is measured; Z-93 obtained from literature (L. Kauder, NASA/TP-2005-212792 entitled "Spacecraft Thermal Control Coatings References" and specifically figure 5.10).

Using the reflectance traces obtained in Example 3(A) above, the UV reflectance, and by association the UV absorption, was obtained by integrating the trace, with respect to the ASTM-G490 Air-mass Zero (AM0) solar irradiance standard spectrum, between wavelengths of 250 and 380 nm. As illustrated in FIG. 3, SWN79 was found to absorb 15% of incident UV radiation ($\alpha_{s,UV}$=0.15) while Z-93 was found to absorb 94% ($\alpha_{s,UV}$=0.94). In Near-Earth-Orbit (NEO) applications (thermally stable), degradation of white coatings is typically associated with prolonged exposure to UV radiation. This degradation can be reduced by limiting the absorption in this range.

In summary, the cured coatings of embodiments of the invention have excellent optical absorbance and thermal emissivity, and are less porous than the conventional white thermal control coatings. They are also non-thermochromic, have reduced electrical resistivity, and have increased UV reflectance, compared with conventional white thermal control coatings. Accordingly, the cured coatings of embodiments of the invention are excellent candidates for use as white thermal control coatings for coating spacecraft and components thereof, and for other passive temperature control applications.

Selection of the Volume Fraction and Particle Size of the Calcium Phosphate Species Increasing the amount of calcium phosphate in the coating composition results in greater electrical conductivity of the cured coating. However, increasing the amount of calcium phosphate in the coating composition can also be detrimental to the optical properties (in particular the reflectance) of the cured coating (i.e. it becomes less white). It is therefore preferable to use an optimum amount of calcium phosphate in the coating composition, such as to provide a good level of electrical conductivity in the cured coating, without undue detriment to its optical properties.

To identify an optimum amount of calcium phosphate for the coating composition we have considered electrical percolation theory. In accordance with such theory (and without being bound by it), with a mixture of dielectric and conductive components, the electrical conductivity $\sigma$ and the dielectric constant (electrical permittivity) $\xi$ of this mixture will exhibit a threshold level of electrical conductivity if the volume fraction of the conductive phase reaches a so-called percolation threshold $p_c$. Work carried out by M. J. Powell in 1979 on site-percolation in randomly packed hard spheres ("Site percolation in randomly packed spheres", Physical Review B 20: 4194) suggests that for rigid spheres of equal size, a volume fraction of 0.310±0.005 would be needed to yield this threshold. Multiplying this figure by a packing density of 0.59 yields a Critical Volume Fraction (CVF) $\phi_c$ of 0.183±0.003.

We therefore recommend that the total volume fraction of the calcium phosphate species (e.g. β-TCP) within the coating composition (including binder phases) should be present in fractions greater than 0.183, or 18.3 vol %. Higher volume fractions of the calcium phosphate species will improve electrical conductivity further, but at the expense of an increase in solar absorptance ($\alpha_s$).

We note too that the packing density of rigid spheres cannot exceed the Kepler Conjecture, which defines cubic- or hexagonal-close packing as the densest possible sphere packing configurations, having a maximum density of $\pi/(3\sqrt{2}) \approx 74.048\%$. Therefore, in practice, $0.183 \leq \phi_c \leq 0.740$.

Additionally, using a particle size of the calcium phosphate species in the range of 200 nm-500 nm has been found to give optimal optical properties in the cured coating. More particularly, optimised scattering is achieved with particles in this size range. This distribution was determined from the Mie solution to Maxwell's equation. For example, a particle diameter of about 270 nm will maximise the scattering coefficient for tricalcium phosphate (TCP). ($Y_2O_3$, by way of comparison, requires a particle size of around 220 nm to achieve a similar effect.) It should also be noted that a small particle size will increase the surface area per g ($cm^2/g$) and this is expected to improve the conductivity (if based on surface area) while minimising the total mass included.

Possible Modifications and Alternative Embodiments

Detailed embodiments have been described above, together with some possible modifications and alternatives.

As those skilled in the art will appreciate, a number of additional modifications and alternatives can be made to the above embodiments whilst still benefiting from the inventions embodied therein.

For example, although in the above examples $Y_2O_3$ is primarily given as the metal oxide species in the curable coating composition, in alternative embodiments other metal oxides may be used instead.

For instance, in an alternative thermal control coating, zinc oxide (ZnO) could be used in place of $Y_2O_3$. Such a coating would be suitable for use in lower temperature environments where thermochromism is not expected to be an issue. One potential advantage of using ZnO is that it will spontaneously react with alkali soluble silicates to form an insoluble phase, eliminating the need for a thermal curing cycle. The removal of a thermal curing cycle may be desirable for some thermally sensitive substrates such as aluminium heat pipes or carbon fibre-reinforced plastic (CFRP) substrates. The inclusion of β-TCP as the calcium phosphate species should allow this composition to retain the advantageous electrical properties of the above-described $Y_2O_3$-based coating (e.g. in respect of electrical conductivity), especially if care is taken to fulfil the criteria to achieve both the percolation threshold and critical volume fractions.

In yet further alternative embodiments, a metal sulphate (for example, but not limited to, a barium sulphate) may be used instead of the metal oxide species in the curable coating composition. Accordingly, in such embodiments, the coating curable composition comprises a silicate, a calcium phosphate and a metal sulphate. Optionally, such a curable coating composition comprises from about 30% to about 90% by weight of the silicate, from about 2% to about 60% by weight of the calcium phosphate, and from about 2% to about 60% by weight of the metal sulphate, the percentages by weight being percentages by weight of the total curable coating composition.

Although, in the above examples, β-TCP is primarily given as the calcium phosphate species in the coating composition, in alternative embodiments other calcium phosphate species may be used instead. In yet further alternatives, the phosphate species need not be a calcium phosphate, but may be a different phosphate species. For example, the phosphate species could an alternative alkali phosphate preferably one which is white in colour, such as magnesium phosphate or sodium phosphate.

Furthermore, although in the above examples sodium silicate, potassium silicate and lithium silicate are primarily given as examples of the silicate species in the coating composition, in alternative embodiments other silicate species may be used instead.

Also on the subject of the silicate species used in the coating composition, it should be noted that certain silicates (e.g. sodium silicate) can exhibit atmospheric stability issues if the atmosphere in which the cured coating is subsequently used contains water (i.e. due to the tendency of the alkali silicate to hydrate). Naturally this is not an issue if the cured coating is to be used in space. However, to improve the atmospheric stability of the cured coating for certain terrestrial applications in which the coating is (or may be) exposed to water, an insoluble barrier layer may be applied to or incorporated in the cured coating, e.g. as a top coat or by cross-linking the outer surface of the silicate (via conversion (CaCl treatment for example) or via exposure to an oxygen-rich post treatment (low temperature plasma or laser treatment).

As those skilled in the art will appreciate, the coating may be cured to a temperature equivalent to the intended operating temperature.

Preferably, the silicate species is made using a sol-gel process. A sol-gel can be made up of organic or inorganic silicon-oxygen backboned precursors (—Si—OR where R can be organic or inorganic). A cured sol-gel coating will crosslink and form an inorganic crosslinked $SiO_2$ structure.

The invention claimed is:

1. A curable coating composition comprising:
   (a) from about 30% to about 90% by weight of a silicate;
   (b) a calcium phosphate; and
   (c) a metal oxide comprising magnesium oxide, aluminum (III) oxide, scandium (III) oxide, yttrium (III) oxide, zirconium oxide, or a combination thereof;
   wherein the composition is a white thermal control paint; and
   wherein the composition, when cured, is non-thermochromic at a temperature up to 500° C.

2. A curable coating composition according to claim 1, which comprises:
   from about 2% to about 60% by weight of the calcium phosphate; and
   from about 2% to about 60% by weight of the metal oxide;
   the percentages by weight being percentages by weight of the total curable coating composition.

3. A curable coating composition according to claim 1, wherein the calcium phosphate comprises a tricalcium phosphate, a tetracalcium phosphate, hydroxyapatite or a derivative thereof, or a combination thereof.

4. A curable coating composition according to claim 3, wherein the calcium phosphate is a tricalcium phosphate selected from α-tricalcium phosphate (α-TCP) and β-tricalcium phosphate (β-TCP), or a combination thereof.

5. A curable coating composition according to claim 4, wherein the calcium phosphate is β-TCP.

6. A curable coating composition according to claim 2, wherein the calcium phosphate is present in an amount of from about 5% to about 40%, by weight of the curable coating composition.

7. A curable coating composition according to claim 1, wherein the calcium phosphate has a particle size in the range of from about $0.1 \times 10^{-6}$ m to about $5 \times 10^{-6}$ m.

8. A curable coating composition according to claim 7, wherein the calcium phosphate has a particle size in the range of from about $0.2 \times 10^{-6}$ m to about $0.5 \times 10^{-6}$ m.

9. A curable coating composition according to claim 1, wherein the metal oxide comprises scandium (III) oxide or yttrium (III) oxide.

10. A curable coating composition according to claim 9, wherein the metal oxide comprises yttrium (III) oxide.

11. A curable coating composition according to claim 2, wherein the silicate is present in an amount of from about 40% to about 80%, by weight and the metal oxide is present in an amount of from about 10% to about 50%, by weight of the curable coating composition.

12. A curable coating composition according to claim 1, wherein the metal oxide has a particle size in the range of from about $0.1 \times 10^{-6}$ m to about $5 \times 10^{-6}$ m.

13. A curable coating composition according to claim 1, wherein the silicate comprises an alkali metal silicate.

14. A curable coating composition according to claim 13, wherein the silicate comprises an alkali metal silicate selected from sodium silicate, potassium silicate and lithium silicate, or a combination thereof.

15. A curable coating composition according to claim 1, wherein the composition, when cured, is UV reflective with an optical absorbance less than or equal to 0.20.

16. A curable coating composition comprising:
(a) a silicate;
(b) β-tricalcium phosphate (β-TCP); and
(c) a metal oxide comprising scandium (III) oxide, yttrium (III) oxide, or zirconium oxide;
wherein the composition is a white thermal control paint; and
wherein the composition, when cured, is non-thermochromic at a temperature up to 500° C. and has an optical absorbance less than or equal to 0.20.

17. A curable coating composition according to claim 16, wherein the composition has a weight ratio of metal oxide to β-TCP of 3:1.

18. A curable coating composition according to claim 16, wherein the composition has a weight ratio of silicate to a sum of metal oxide and β-TCP of 1:1.

19. A curable coating composition comprising:
(a) sodium silicate;
(b) β-tricalcium phosphate (β-TCP) particles ranging from $0.2 \times 10^{-6}$ m to $0.5 \times 10^{-6}$ m in diameter; and
(c) a metal oxide comprising scandium (III) oxide or yttrium (III) oxide;
wherein the composition is a white thermal control paint; and
wherein the composition, when cured, is non-thermochromic at a temperature up to 1000° C. and has an optical absorbance less than or equal to 0.20.

* * * * *

UNITED STATES PATENT AND TRADEMARK OFFICE
CERTIFICATE OF CORRECTION

| | |
|---|---|
| PATENT NO. | : 10,100,203 B2 |
| APPLICATION NO. | : 15/324276 |
| DATED | : October 16, 2018 |
| INVENTOR(S) | : Kevin A. J. Doherty, Barry Twomey and Kenneth Stanton |

Page 1 of 1

It is certified that error appears in the above-identified patent and that said Letters Patent is hereby corrected as shown below:

On the Title Page

Item (57) in Line 3 of the Abstract, "such calcium" should read --such as calcium--.

Signed and Sealed this
Ninth Day of April, 2019

Andrei Iancu
*Director of the United States Patent and Trademark Office*